Patent Text

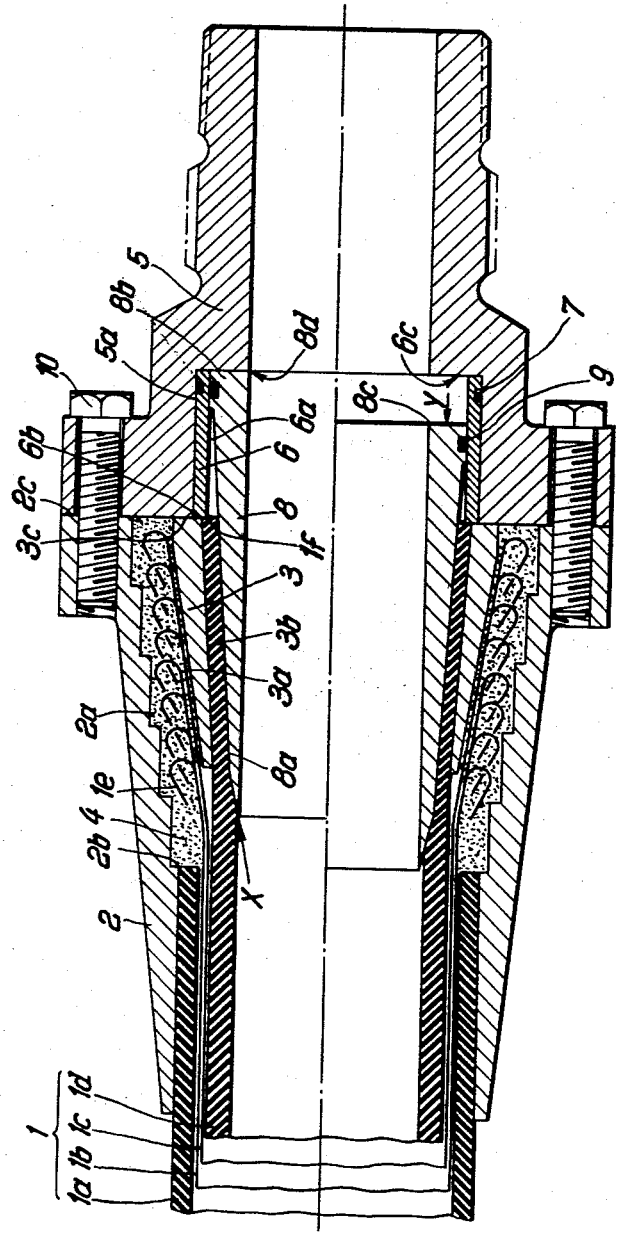

2,940,778

FITTING FOR A LARGE-DIAMETER RUBBER OR PLASTIC HOSE SUBJECTED TO HIGH LOADS

Rudolf Kaiser, Rohrerweg 18, Ettlingen, Baden, Germany

Filed Dec. 24, 1956, Ser. No. 630,294

Claims priority, application Germany Apr. 25, 1956

2 Claims. (Cl. 285—95)

This invention relates to fittings for large-diameter hoses subjected to high loads, such as for example flush-boring hoses. It is not possible to use on such hoses, of for example three inches in diameter, fittings of the same construction as those used with hoses of small diameter, since they are more elastic, more cumbersome, and are subjected to considerably higher tractive stresses.

The object of the invention is to provide a fitting which meets all the practical requirements of large-diameter hoses subjected to high loads, and which can be mounted in a relatively simple and secure manner. The invention proceeds from a known fitting for rubber or plastic hoses whose walls have an intermediate layer consisting of wire netting which is freed of its outer covering layer in the region of the hose end where the latter projects into the hose socket, the outer covering layer being replaced in said region by a layer of material which is harder than the removed covering layer and which is run into the hose socket, and a conical nipple is inserted into the inside of the hose end.

The invention solves the problem described hereinbefore by slightly bending back the ends of the steel wires of the intermediate layer in the hose wall, preferably in the outward direction, before applying the molten sealing material—e.g. molten metal or synthetic plastic material—for casting-in the hose socket, the internal diameter of which increases in the direction towards the hose end, in such manner that these steel wires can take up tractive force exerted on the finished mounting fitting. In the case of the fitting according to the invention a wedge-shaped ring constitutes a boundary wall on the hose core side of the annular space which is allowed inside the hose socket for receiving the sealing material encasing the bent-over wire ends. This wedge-shaped ring is inserted between the intermediate wire layer of the hose and the hose core before the casting-in operation.

Further constructional details of the invention will become apparent from the following description of one constructional example with reference to a drawing which shows a longitudinal sectional view through the axis of a hose fitting. During the course of this description the method for fixing the fitting according to the invention on the end of the hose will also be explained.

In the drawing, the reference numeral 1 designates a so-called flush-boring hose. The latter comprises a rubber covering layer 1a, two layers 1b and 1c of steel wires wound in the right-hand and left-hand directions respectively at angles of approximately 45°, and a rubber hose core 1d. The hose 1 is fixed inside the hose socket 2 and its outer layer 1a is removed as far as the end face 2b. The hose core 1d is clamped, as far as its end face 1f, between the wedge-shaped ring 3 and the conical nipple 8. The wire ends 1e of the wire layers 1b and 1c are bent over outwards through approximately 180° and anchored in the sealing material 4 between the hose socket 2 and wedge-shaped ring 3. The sealing material 4 consisting either of metal or of synthetic plastic material, is held in position in the annular steps 2a of the hose socket 2 and in the manner of a cone between the steps 2a and the outer surface 3a of the wedge-shaped ring 3. After the fitting has been finally securely mounted, a tractive force exerted on the hose 1 can be taken up by the wires 1b and 1c. The annular steps 2a of the hose socket 2 are not absolutely necessary. It is also sufficient if the inner side of the hose socket 2 is of a smooth construction. However, the inner diameter of the hose socket 2 must increase towards the hose end.

The conical nipple 8 is guided in the nipple head 5 and is pressed into the hose core 1d by means of the bolts 10 which connect the hose socket to the nipple head 5. The conical surface 8a of the nipple 8 presses the hose core 1d against the inner surface 3b of the wedge-shaped ring 3. The hose-pipe channel is thereby sealed from the exterior. The piston portion 8b of the conical nipple 8 is sealed by means of the O-ring 9 relatively to the inner wall of the sleeve 6. The latter is guided in the inner bore 5a of the nipple head 5 and is sealed relatively to the latter by the O-ring 7.

The conical outer surface 8a of the nipple 8 which is pressed into the hose core 1d with the nipple head 5 by means of the bolts 10, bears against the hose core 1d with a sealing action. When the medium flowing through the hose-pipe reaches a specific pressure, however, the mechanically produced pretensioning would no longer be sufficient to provide fluid-tightness. The pressure medium would force its way between the cone 8a and the hose core 1d and press the hose core against the inner surface 3b of the wedge-shaped ring and bring about a flow in the direction of the arrow x. This is prevented in that the end face 8c of the piston portion of the nipple 8 produces a greater force in the direction of the arrow y. The pressure medium enters the gap 8d between the conical nipple and the head 5 and pushes the nipple 8 in the manner of a piston in the direction of the arrow y. This operation is illustrated diagrammatically below the centre line of the drawing. The axial displacement of the piston 8 results in cone 8a being pressed more strongly against the hose core 1d. In this way fluid-tightness of the conduit is guaranteed at all pressures.

If, for example, the annular surface 8c of the nipple 8 is greater than the projection of the central sealing surface 8a in the case of a hose of 3 inches diameter and 900 atmospheres excess pressure bursting pressure, then an additional pressure of 6×900 kg.=5,400 kg.=5.4 t. acts on the end face 8c of the nipple 8.

The sleeve 6 sliding in the internal bore 5a of the nipple head 5 is pressed by the pressure of the medium entering the gap 6c against the end face 3c of the wedge-shaped ring 3 and thus produces a supporting counter-pressure of the outer face 3a of the wedge-shaped ring 3 against the sealing material 4.

The hose fitting described is fixed on the hose 1 in the following manner:

First of all the hose socket 2 is fitted over the hose end 1 and the rubber covering layer 1a is released and moved from the intermediate wire layer 1b as far as the end step 2b. Then the ends 1b of the wires 1b and 1c are bent back outwards by preferably over 180°, as the drawing shows. After the hose socket 2 has been pressed back to the hose end until substantially the front edge 2c of the hose mounting 2 is situated in the same plane as the end face 1f of the hose core 1d, the wedge-shaped ring 3 is inserted between the bent-back wire ends 1e of the wires 1b and 1c on the one hand and the hose core 1d on the other hand, and is fixed in this position by a mounting device which is not shown in the drawing. This fixing of the wedge-shaped ring 3 is necessary in order to prepare for pouring in the sealing material 4.

In order that the liquid metal—for example lead—or liquid synthetic plastic material used as sealing material can flow in a uniformly distributed fashion into the annular space between the hose socket 2 and the wedge-shaped ring 3, the axis of the hose socket must remain vertical during the pouring-in operation. When the sealing material has cooled and the mounting for holding the wedge-shaped ring 3 has been removed, the part of the sealing material 4 which projects from the hose socket 2 is cut away so that the upper end face of the sealing material 4 is situated in the same plane as the end face 2c of the hose socket 2 and the end face 1f of the hose core 1d. Then the nipple 8, guided in the nipple head 5 or in the sleeve 6 thereof, is inserted into the inside of the hose core 1d. Then the nipple head 5 is secured to the hose socket 2 by means of the bolts 10, which forces the nipple 8 further in to the hose core 1d.

It has already been described how the hose fitting described hereinbefore is subsequently sealed automatically. This subsequent sealing occurs automatically even when the rubber or plastic layers of the hose 1 age and thus lose their elasticity.

I claim:

1. In a hose fitting, for a large diameter hose subjected to high loads and having an inner resilient core, an intermediate wire layer and an outer resilient covering layer terminating short of the front end of the hose, in combination, the ends of the wires of the front portion of said intermediate wire layer being bent outwardly and thence backwardly into hook form, a fitting structure comprising a hollow socket surrounding the front end of the hose with a rear portion engaging the outer surface of said covering layer and a front portion having an enlarged internal surface and a tubular nipple head releasably connected to said socket, an annular wedge member disposed within said socket and having an outer surface and an inner surface, both surfaces being tapered, flaring outwardly in the direction towards the front end of the hose, said inner surface having a minimum diameter substantially equal to the outer diameter of said hose core, said outer surface of said annular wedge member defining with said internal surface of said socket a chamber, the front portion of said wire layer including the bent wire ends being disposed in said chamber, a substantially non-resilient hard sealant mass filling said chamber and embedding said wire ends, said chamber and sealant mass therein having a radial thickness larger than the thickness of said wire layer, said sealant mass extending rearwardly to the end of said covering layer, said wedge member extending from said front end of said hose to a point near the rear end of said sealant mass, and an axially movable nipple member slidably supported in said nipple head and extending to a point near the rear end of said sealant mass and having an outwardly flaring, tapered external surface and a cylindrical inner surface with a diameter substantially equal to the inner diameter of said hose core, the end portion of said inner core being engaged and deformed conically between the external tapered surface of said nipple member and the inner tapered surface of said wedge member, said nipple member having a front end face disposed within said nipple head and having a rear end face disposed within said inner core, said front end face being larger than said rear end face.

2. In a hose fitting, as claimed in claim 1, said nipple head defining an enlarged internal cylindrical recess open toward said hose end, a sleeve positioned in sealed relation in said recess and slidably guiding on its interior the front end of said nipple member, and sealing means between said nipple member and said sleeve.

References Cited in the file of this patent

UNITED STATES PATENTS

| | | |
|---|---|---|
| 1,054,244 | Rudolph | Feb. 25, 1913 |
| 2,234,350 | Muller | Mar. 11, 1941 |
| 2,277,397 | Graham | Mar. 24, 1942 |
| 2,363,586 | Guarnashchelli | Nov. 28, 1944 |
| 2,428,189 | Wolfram | Sept. 30, 1947 |
| 2,485,976 | Main | Oct. 25, 1949 |
| 2,610,869 | Allison | Sept. 16, 1952 |
| 2,685,458 | Shaw | Aug. 3, 1954 |
| 2,685,459 | Panagrossi | Aug. 3, 1954 |
| 2,712,458 | Lipson | July 5, 1955 |
| 2,753,196 | Melsom | July 3, 1956 |
| 2,809,056 | Kaiser | Oct. 8, 1957 |

FOREIGN PATENTS

| | | |
|---|---|---|
| 535,415 | Great Britain | Apr. 9, 1941 |
| 573,661 | Great Britain | Nov. 30, 1945 |
| 1,094,698 | France | Dec. 8, 1954 |